United States Patent [19]

Adams

[11] 4,377,551

[45] Mar. 22, 1983

[54] INCORE CUTTING MACHINE

[75] Inventor: William E. Adams, South Haven, Mich.

[73] Assignee: Consumers Power Company, Jackson, Mich.

[21] Appl. No.: 183,200

[22] Filed: Sep. 2, 1980

[51] Int. Cl.³ .............................................. G21C 19/00
[52] U.S. Cl. .................................. 376/260; 376/463;
    29/426.4; 252/627; 252/633; 83/580; 83/925 R
[58] Field of Search .............. 376/260, 261, 264, 267,
    376/438, 463; 29/426, 427; 252/626, 627, 633;
    83/580, 925 R

[56] References Cited

U.S. PATENT DOCUMENTS 3,514,838  6/1970  Freeborg ............................ 376/438

FOREIGN PATENT DOCUMENTS 1210494  2/1966  Fed. Rep. of Germany ...... 252/627
54-30398  3/1979  Japan .................................. 252/626

Primary Examiner—Donald P. Walsh
Attorney, Agent, or Firm—Beaman & Beaman

[57] ABSTRACT

The invention pertains to apparatus for severing elongated radioactive cables into short sections for waste storage purposes. During operation the apparatus is submerged within a water shield and the cable to be cut is guided into feed rollers driven by an electric motor. The feed rollers and a shear are operated by a common electric motor, and indexing mechanism intermittently rotates the feed rollers in synchronization with the shear operation. The feed roller movement is reversible permitting removal of an enlarged cable end incapable of passing through the rollers.

9 Claims, 8 Drawing Figures

INCORE CUTTING MACHINE

BACKGROUND OF THE INVENTION

The fuel core for a nuclear reactor requires periodic replacement and a significant and critical aspect of nuclear power plant operation is the removal of a depleted fuel core assembly and the replacement thereof with a new fuel assembly. Within selected fuel assemblies are incore detectors that require removal and storage, such as by the use of cutting and shear apparatus, wherein the resultant smaller parts are placed within storage containers for removal and storage. Of course, due to the radioactivity of the fuel core components extreme care must be exercised in the processing and handling of the core components during preparation for storage, and it is common practice to disassemble the core while the components are submerged in the usual borated water shield in which the reactor is normally located.

Among the fuel core components which are to be stored are incore detector cables which are approximately 35 feet long and 7/32 inches in diameter. These cables are radioactive and it has been the usual practice to employ a manual hydraulically operated cutter to cut the cable into short pieces for storage in a cask. As the operation of the hydraulic cutter must take place underwater the manual cutting of the incore detector cables are difficult, inefficient and time consuming, and because of the problems encountered the volume of the storage container was not efficiently utilized.

It is an object of the invention to provide apparatus for automatically severing incore detector cables as used with nuclear reactor fuel assemblies into short lengths for waste storage purposes wherein the apparatus is capable of being operated while submerged in a water shield pool.

Another object of the invention is to provide apparatus for severing radioactive incore detector cables into short lengths for storage purposes wherein the apparatus is self-contained, except for an external electrical power source, and the operation is automatic and self-synchronized, and a high degree of skill on the part of the operator is not required.

A further object of the invention is to provide apparatus for shearing incore detector cables into short lengths for storage purposes wherein a single electric motor is used to intermittently drive feed rollers which feed the cable into a synchronized shear, the utilization of common driving means for the feed rollers and shear assuring proper synchronization between cable advancing and cutting.

Yet another object of the invention is to provide a cutter for incore detector cables wherein electric motor driven feed rollers intermittently advance the cable into a shear, and the motor may be reversed to permit an enlarged end of the cable to be removed from the apparatus.

The apparatus of the invention includes a base upon which both the cable cutting mechanism is supported as well as the disposable cask liner receiving the severed cable lengths. The entire apparatus may be lowered as a unit into the water-filled reactor cavity whereby the apparatus will be submerged in approximately 25 feet of borated water which functions as a shield. The shearing apparatus includes a watertight housing in which an electric motor is located having a vertically oriented drive shaft. The motor shaft drives a speed reduction transmission having an output shaft with which a Geneva intermittent drive transmission is associated, as is the eccentric crank structure which operates the shear.

The Geneva drive mechanism indexes a feed roller assembly located exteriorly of the motor and transmission casings whereby feed rollers intermittently rotate to feed the cable to be severed into the shear structure located below. A feed funnel located above the feed rollers aids in aligning and feeding the cable into the roller apparatus, and the movement of the cable during cutting is downward, the storage cask liner being located directly below the shear.

The incore detector cable is handled by gripping devices attached to the end of a pole, and the end of the cable is aligned with the feed funnel for reception into the feed roller assembly. As the feed rollers intermittently rotate and feed the cable into the shear each cycle of the shear will sever a 4" cable length which falls into the cask liner. The "upper" or "rear" end of the incore detector cable contains a seal plug and connector which is of such dimension as to not be capable of passing through the feed rollers and the last two feet of the cable are removed from the cutting apparatus be reversing the direction of rotation of the drive motor and this end portion of the cable is dropped into the cask liner without passing through the shear. After the cable shearing operation is completed the entire assembly, including cask liner, is removed from the reactor cavity pool, and the cask liner is removed from the apparatus base and processed for permanent storage.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
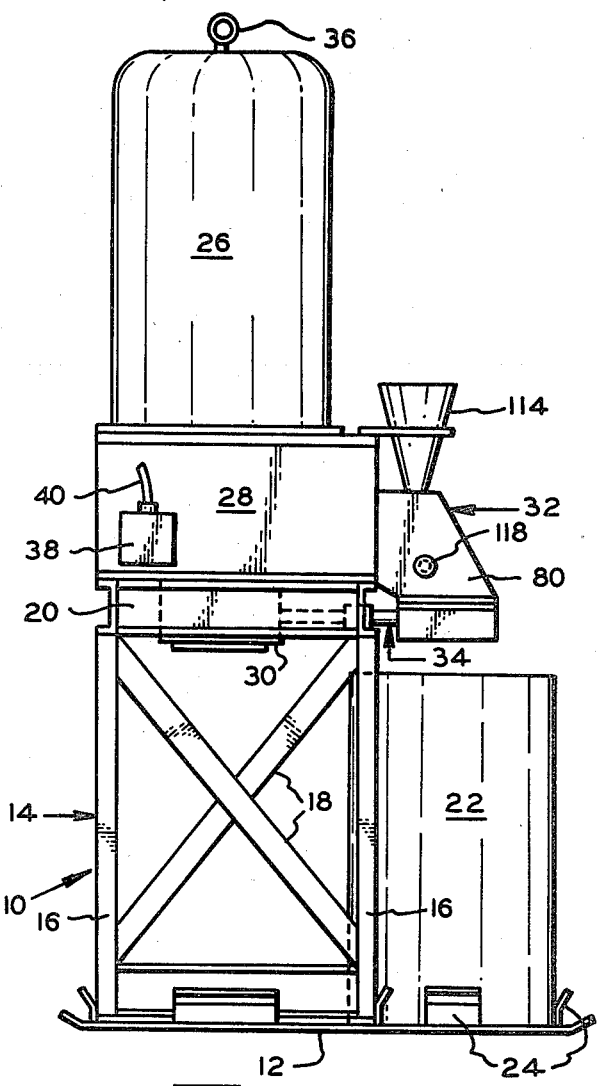
FIG. 1 is a side elevational view of incore detector cable cutting apparatus in accord with the invention.
Figure 2:
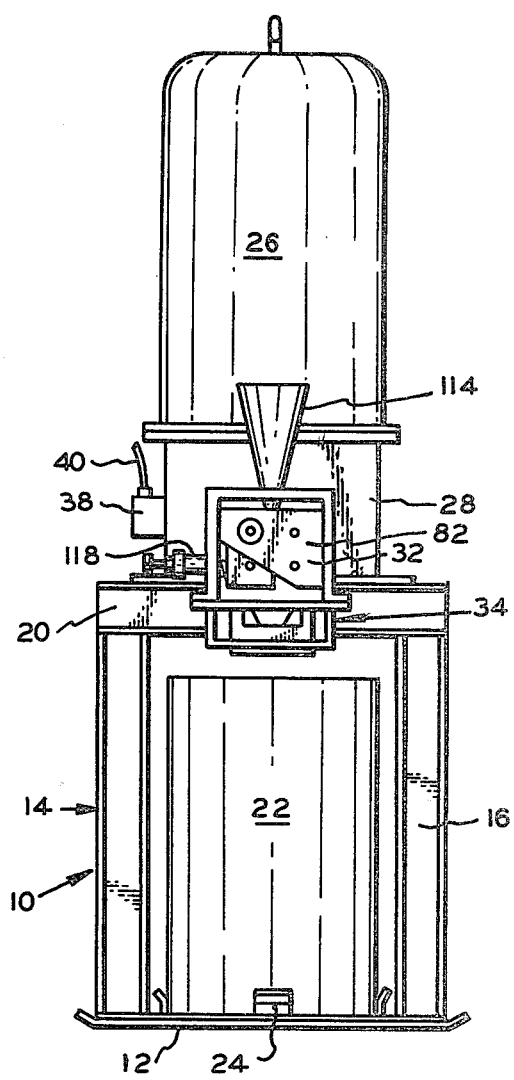
FIG. 2 is a front elevational view of the apparatus of FIG. 1 as taken from the right thereof.
Figure 3:
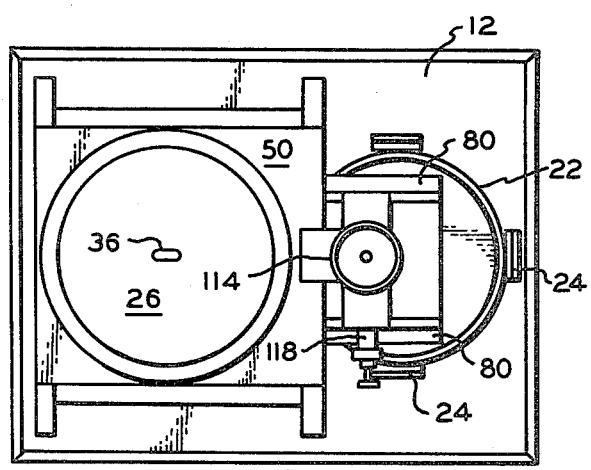
FIG. 3 is a top plan view.

With reference to FIGS. 1-3, the basic relationship of the components of the apparatus of the invention will be appreciated. A base, generally indicated at 10, includes a skid plate 12 upon which a column 14 extends formed of vertically disposed corner pieces 16 braced by diagonals 18 and including a U beam platform 20 located at the upper end of the column. The portion of the skid plate 12 extending to the right of the column 14, FIG. 1, serves as a support for the cask liner 22 and upwardly extending guides 24 formed on the skid plate maintain the liner, which has an open upper end, at the desired location on the base, which is directly below the shear, as later described.

The cutting apparatus is mounted upon the column platform 20 and includes an upper cylindrical casing 26 attached to a lower transmission housing 28, the casing and housing being bolted together in watertight relationship. An outboard bearing support 30 is attached to the underside of the transmission housing 28 as will be later described with respect to FIG. 5.

The feed roller assembly housing is generally indicated at 32, and the shear blade assembly 34 is located below the feed roller assembly, and directly above the cask liner 22. An eye bolt 36, fixed to the upper end of the casing 26 permits the entire unit to be lifted for placing within the reactor pool, and a waterproof electrical connection 38 mounted upon the transmission housing 28 permits electrical power to be supplied to the apparatus through external power supply cord 40, FIG. 1.

The details of the cutting machine apparatus are best appreciated from FIGS. 5–8. The motor casing 26 houses the electric motor 42 which is of the vertical shaft type and is mounted upon a speed reducing transmission 44 having an input shaft coaxial and connected to the electric motor shaft, not shown, and an output shaft 46 upon which flexible coupling 48 is mounted. This motor and transmission assembly is supported upon the transmission housing upper plate 50 upon pedestal 52 bolted to the plate.

The motor 42, at its upper end, includes an air discharge deflector 54 whereby air drawn into the motor by conventional cooling blades affixed to the motor armature is discharged downwardly along the motor casing past the transmission 44. A cylindrical shroud 56 mounted within casing 26 guides the air flow within the casing as indicated by the arrows wherein a cooling circulation past the motor and transmission occurs, the air during its upward movement being cooled by the inner casing wall which is cooled by the water within the reactor pool.

A transmission shaft 58 is vertically oreinted within the housing 28 and is rotatably supported therein by sleeve bearings 60 and 62, the bearing 62 constituting an outboard bearing mounted within a plate 64 extending below transmission housing 28. A packing gland assembly 66 prevents water from entering the interior of the transmission housing 28, and the shear apparatus 34 is located exteriorly, and below the housing.

Figures 5, 6:
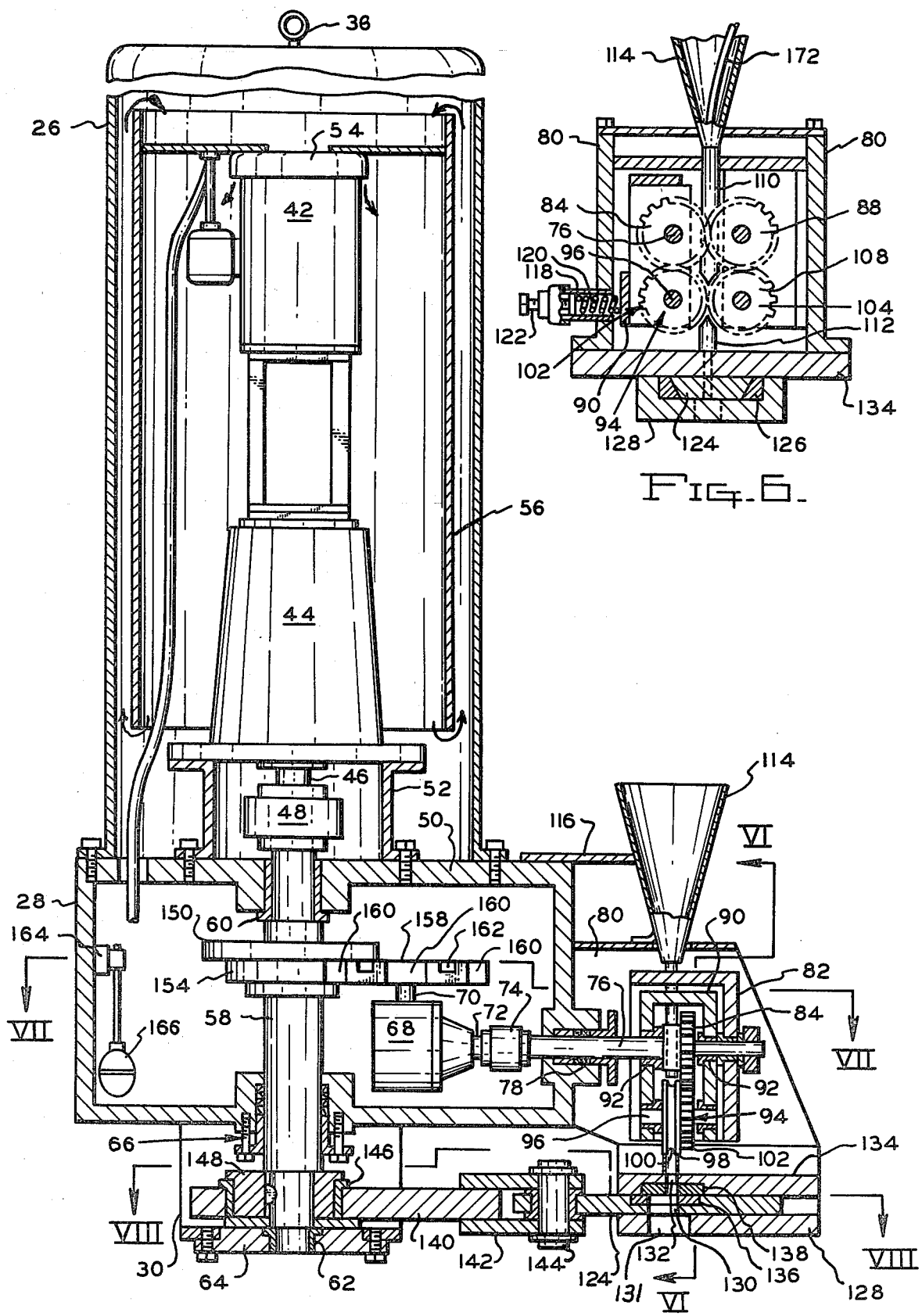
FIG. 5 is an elevational, cross sectional view of the cutting apparatus housing and feed roller assembly.
FIG. 6 is an elevational, sectional view taken through the roller assembly along Section VI—VI of FIG. 5.
Figure 7:
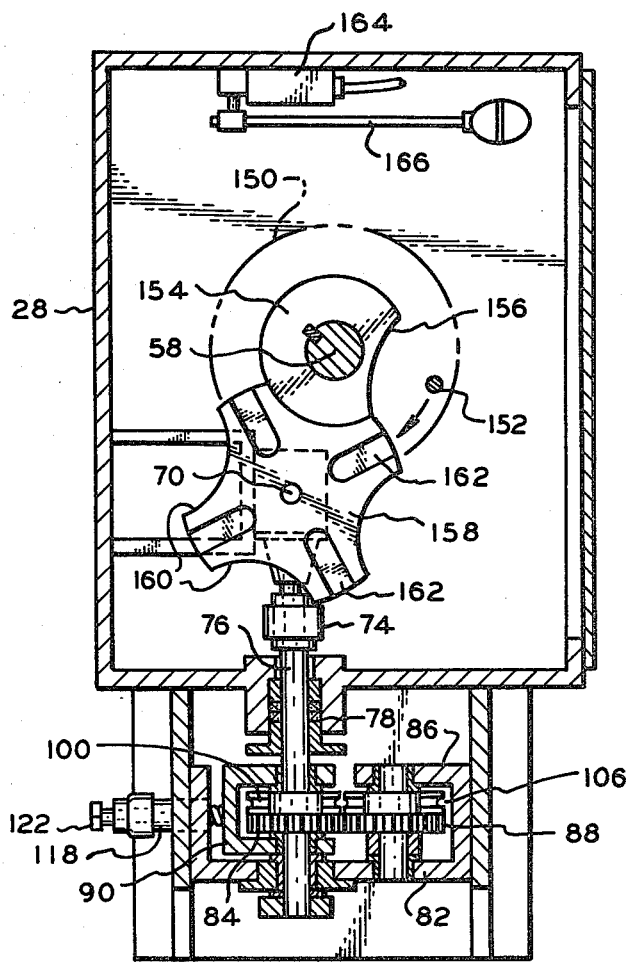
FIG. 7 is a plan sectional view as taken along Section VII—VII of FIG. 5.
Figure 8:
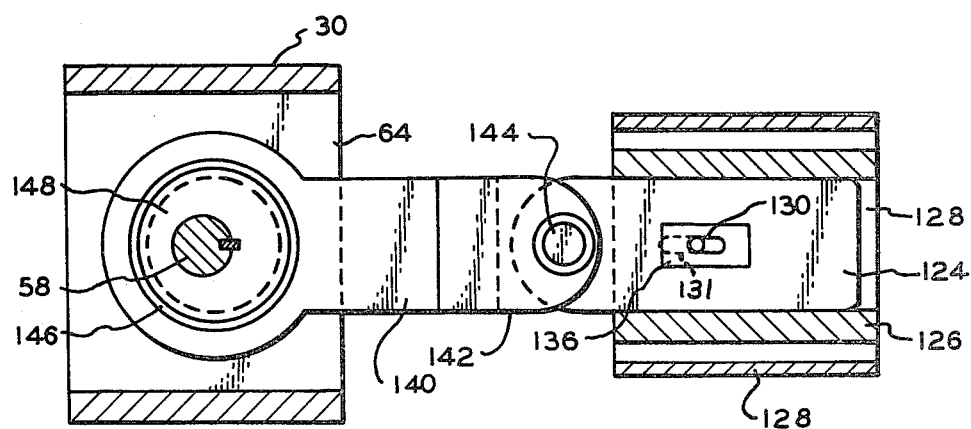
FIG. 8 is a plan view of the shear structure as taken along Section VIII—VIII of FIG. 5.

The feed roller drive includes a transmission 68 located within the transmission housing 28 having a vertically disposed input shaft 70, FIG. 5, and an output shaft 72 upon which coupling 74 is mounted, and the feed roller drive shaft 76 extends from the housing through the watertight bearing and packing gland assembly 78.

The feed roller assembly 32 is mounted upon a pair of spaced plates 80 extending from the right wall, FIG. 1, of the transmission housing 28. The feed roller assembly drive shaft 76 outer end is rotatably supported upon plate 82 extending between plates 80, and the drive gear 84 is affixed thereto. A plate 86 also mounted on a plate 80 and spaced from plate 82 supports a second drive gear 88 therebetween, and the teeth of gears 84 and 88 mesh wherein both gears are driven by shaft 76.

A U shaped cradle 90 is rotatably suspended from shaft 76 on bearings 92 and a feed roller 94 is rotatable mounted on cradle 90 on shaft 96. The roller 94 includes a grooved portion 98 having an annular groove 100 defined therein and gear portion 102 meshes with drive gear 84. A second feed roller 104 is rotatable mounted between plates 82 and 86 below drive gear 88 and includes a grooved portion having groove 106 formed therein and gear portion 108 meshing with gear 88.

As best appreciated from FIG. 6, a guide tube 110 is located within the feed roller assembly 32 and extends between gears 84 and 88 in alignment with the feed roller grooves 100 and 106 and a lower guide tube 112 receives the cable as it passes the feed rollers. The upper portion of the guide tube 110 is associated with the intake or feed funnel 114 attached to housing 28 by bracket 116, and the upwardly diverging feed funnel permits the cable to be readily inserted into the guide tube 110, initially, and during cutting.

A spring guide tube 118 mounted on a plate 80 houses a compression spring 120 which bears against the lower portion of cradle 90 and biases feed roller 94 toward roller 104. By adjusting bolt 122 which engages the outer end of spring 120 the frictional "grip" of the roller grooves 100 and 106 on a cable therein can be varied for purposes later described.

A shear blade 124 is mounted for reciprocal movement directly below the feed roller assembly 32 and the shear blade is guided in ways 126 affixed to plate 128 mounted upon the plates 80. The shear blade 124 includes an elongated opening 130, FIG. 8, in line with the cylindrical opening 132 defined in plate 134, and these openings are formed in hardened inserts 136 and 138 mounted in the blade 124 and plate 134, respectively, which produce hardened edges at the location of shear. The opening 132 is in direct alignment with the cable guide tube 110 and opening 131 in plate 128 and the cable is fed into the opening 132 from the feed roller assembly.

Reciprocation of the shear blade 124 is achieved by a crank mechanism which includes a connecting rod 140 affixed at one end to the shear blade by a yoke 142 and pin 144.

The other end of the connecting rod 140 is formed with a sleeve bearing 146 which houses an eccentric 148 keyed to the shaft 58. Thus, as the shaft 58 rotates the eccentric 148 will cause a horizontal oscillation of the connecting rod, and the shear blade 124 will reciprocate within its ways 126. The length of the shear blade opening 130 in the direction of oscillation is such that the detector cable will freely pass through openings 132, 130 and 131 during cable feeding, as in FIG. 5, and after the cable movement terminates the edges of the hardened openings 130 and 132, will overlap and produce a shearing of the cable when the blade 124 is in the extended position of FIG. 8.

The feed rollers 94 and 104 rotate intermittently, and this indexing movement is produced by a Geneva mechanism which includes a disc 150 mounted upon shaft 58 having an actuating pin 152 extending downwardly therefrom. The mechanism also includes a circular plate 154, FIG. 7, having a recess 156 defined therein of a circular segment diameter sufficient to accomodate the indexing of the Geneva wheel 158.

The Geneva wheel 158 is fixed upon the feed roller transmission input shaft 70 and is of conventional construction utilizing four cylindrical peripheral recesses 158 corresponding in radius to the radius of the plate 154, and radial grooves 162 sequentially receive the pin 152 during each rotation of the shaft 58. Thus, each rotation of the shaft 58 produces a one quarter rotation of the Geneva wheel 158 which results in an indexing rotation of the feed rollers 94 and 104 for advancing the incore detector cable approximately 4". As the feed rollers are advancing, the cable freely passes through the opening 132 and shear blade slot 130, and the angular orientation between the Geneva wheel mechanism and the eccentric 148 assures that feed roller rotation will terminate during shearing of the cable.

For safety purposes an electric switch 164 operating an alarm is mounted within the transmission housing 28 having an actuating float 166 attached thereto in the event that water leakage occurs within the housing or casing 26 wherein such leakage can be detected and the apparatus pulled from the reactor pool before substantial damage occurs.

Figure 4:
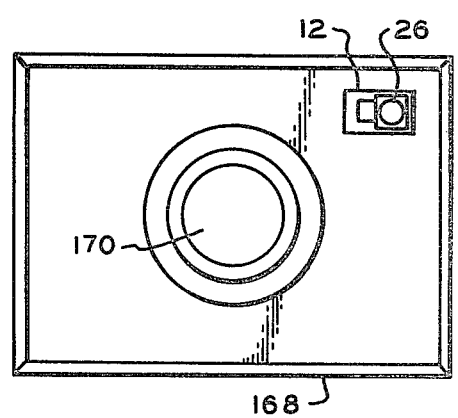
FIG. 4 is a plan, schematic view illustrating a typical positioning of the cutting apparatus within the reactor pool during use.

In use, the cutting apparatus is lowered into the reactor cavity pool 168, FIG. 4, relatively close to the reactor vessel 170. The apparatus will rest upon a floor within the reactor pool, and will often be about 25 feet below the water surface.

The incore detector cables 172 utilized with the fuel assembly are remotely handled by gripping members attached to the end of a pole, and these cables may be approximately 35 feet long and 7/32" in diameter. The motor 42 is energized and the shaft 58 will begin rotating at approximately 56 rpm causing an indexing of the feed rollers 94 and 104 during each shaft revolution, as well as a synchronized movement of the shear blade 124.

The operator feeds the lead end of the incore detector cable 172 to be severed into the feed funnel 114, and upon the end of the cable being received between the grooves 100 and 106 of the feed rollers 94 and 104 the cable will be automatically fed into the opening 132 and through the shear blade slot 130 and severed into 4" lengths at the rate of 56 cycles per minute. As the last two feet of the incore detector cable contain a seal plug and connector which are too large to pass through the feed roller assembly upon this enlarged structure engaging the feed funnel 114 the feed roller grooves 100 and 106 will slip on the cable and cable advance is terminated, and this section of the cable is removed from the feed roller apparatus by reversing the direction of rotation of motor 42, and this end of the cable is then dropped into the cask liner 22 manually. By adjusting the compression of spring 120 the "slippage" of the feed rollers is regulated to achieve the aforedescribed operation.

After the set of incore cables have been severed, for instance forty-five cables, the entire apparatus is lifted from the reactor pool 168 and the cask liner 22 removed from the skid plate 12 for preparation for permanent storage. The use of the disclosed apparatus permits a complete set of incore detector cables to be located within a single cask liner, as compared with the requirement for two liners by previous methods of cable severing, and the self-feeding and synchronized operation of the apparatus requires a minimum of operator skills, and yet the mechanism is dependable in operation.

It is appreciated that various modifications to the inventive concepts may be apparent to those skilled in the art without departing from the spirit and scope of the invention.

I claim:

1. Apparatus for shearing elongated radioactive members into short lengths while located within a water shield comprising, in combination, a frame adapted to be supported within a water shield pool, a vertically oriented elongated member feed path defined on said frame having upper, central and lower regions, an upwardly opening intake funnel mounted on said frame defining said feed path upper region, a pair of feed rollers rotatably mounted on said frame having peripheral portions located in opposed relationship within said feed path central region below said funnel and in alignment therewith whereby an elongated member within said central region engages said peripheral portions and is axially translated by said rollers, a shear movably mounted on said frame below said rollers and movable through said feed path lower region, electric motor means mounted on said frame, and transmission means mounted on said frame driven by said electric motor means operatively connected to and driving said feed rollers and shear whereby elongated members inserted into said intake funnel are moved through said feed path by said rollers and severed into short lengths by said shear.

2. In apparatus for shearing radioactive members as in claim 1 wherein said transmission means includes intermittently operated rotary means driving said feed rollers whereby the elongated member within said feed path is intermittently fed into said shear and severed into predetermined lengths.

3. In apparatus for shearing radioactive members as in claim 2 wherein said intermittent rotary transmission means comprises a Geneva drive.

4. In apparatus for shearing radioactive members as in claim 1, said shear comprising a blade guide mounted on said frame adjacent said feed path lower region, a blade slidably mounted within said blade guide for reciprocal movement therein, said transmission means including a rotating shaft, an eccentric crank bearing mounted upon said rotating shaft, and a crank rod connecting said blade and crank bearing whereby said blade reciprocates within said guide during rotation of said shaft.

5. In apparatus for shearing radioactive members as in claim 1, wherein said electric motor means comprises a single electric motor, said transmission means including a speed reducing transmission driven by said motor and having an output shaft, intermittent drive means connecting said feed rollers to said output shaft for intermittently rotating said feed rollers through a predetermined angular rotation each revolution of said output shaft, an eccentric crank bearing mounted on said output shaft, and a crank rod connecting said shear to said crank bearing whereby said shear oscillates through said feed path between shearing and non-shearing positions during each revolution of said output shaft.

6. In apparatus for shearing radioactive members as in claim 1, a watertight casing mounted upon said frame having an inner surface, said electric motor being located within said casing, air circulation means defined on said motor circulating air through said motor and casing during motor operation, and air baffle means within said casing directing circulating air into contact with said casing inner surface for cooling the air.

7. In apparatus for shearing radioactive members as in claim 1, means mounting at least one of said feed rollers for adjustable movement toward the other feed roller, and adjusting means associated with said one feed roller for adjustment thereof.

8. In apparatus for shearing radioactive members as in claim 7, wherein said means mounting said one feed roller for adjustable movement comprises a pivotally mounted cradle, said adjusting means engaging said cradle.

9. In apparatus for shearing radioactive members as in claim 8, wherein said adjusting means comprises a compression spring biasing said one feed roller toward said other feed roller, and spring adjustment means engaging said spring to vary the compression thereof.

* * * * *